United States Patent
Cen et al.

(10) Patent No.: US 11,981,061 B2
(45) Date of Patent: May 14, 2024

(54) PREPARATION METHOD OF A PASSIVE HORN

(71) Applicant: Tymphany Acoustic Technology (Huizhou) Co., Ltd., Huizhou (CN)

(72) Inventors: Shuhong Cen, Huizhou (CN); Cheng Ho, Huizhou (CN)

(73) Assignee: TYMPHANY ACOUSTIC TECHNOLOGY (HUIZHOU) CO., LTD., Huizhou (CN)

(*) Notice: Subject to any disclaimer, the term of this patent is extended or adjusted under 35 U.S.C. 154(b) by 1234 days.

(21) Appl. No.: 16/405,500

(22) Filed: May 7, 2019

(65) Prior Publication Data
US 2020/0001509 A1 Jan. 2, 2020

(30) Foreign Application Priority Data
May 7, 2018 (CN) .......................... 201810426800.8

(51) Int. Cl.
| | |
|---|---|
| B29C 45/14 | (2006.01) |
| B29C 35/02 | (2006.01) |
| B29C 45/16 | (2006.01) |
| G10K 13/00 | (2006.01) |
| H04R 7/04 | (2006.01) |
| H04R 31/00 | (2006.01) |
| B29K 69/00 | (2006.01) |
| B29K 83/00 | (2006.01) |

(Continued)

(52) U.S. Cl.
CPC .......... *B29C 45/1671* (2013.01); *B29C 35/02* (2013.01); *B29C 45/14819* (2013.01); *B29C 45/1676* (2013.01); *G10K 13/00* (2013.01); *H04R 7/04* (2013.01); *H04R 31/003* (2013.01); *B29C 2045/1673* (2013.01); *B29K 2069/00* (2013.01); *B29K 2083/005* (2013.01); *B29K 2705/12* (2013.01); *B29K 2995/002* (2013.01); *B29L 2031/38* (2013.01)

(58) Field of Classification Search
CPC ............ B29C 45/1671; B29C 45/1676; B29C 45/14819
See application file for complete search history.

(56) References Cited

U.S. PATENT DOCUMENTS
11,338,483 B2 * 5/2022 Cen ................... B29C 45/14065

FOREIGN PATENT DOCUMENTS
| | | | |
|---|---|---|---|
| JP | 2017041715 | * | 2/2017 |
| JP | 2017069853 | * | 4/2017 |

* cited by examiner

*Primary Examiner* — Edmund H Lee
(74) *Attorney, Agent, or Firm* — Muncy, Geissler, Olds & Lowe, P.C.

(57) ABSTRACT

A passive horn integrally formed by using liquid silicone rubber, includes a first outer casing, a second outer casing, an inner casing and an iron piece. The first outer casing includes a sealing ring, a folding ring and a vibrating membrane, and the sealing ring, the folding ring and the vibrating membrane are integrally injection molded into the first outer casing. A groove is disposed in the second outer casing, and the first outer casing is disposed in the groove. The back surface of the vibrating membrane is provided with a casing groove, which is sequentially embedded with the inner casing and the iron piece. A preparation method of a passive horn integrally formed by using liquid silicone rubber, under the condition of integrated injection molding, may improve the yield rate, ensure product quality, save assembly time and labor cost, and improve production efficiency.

7 Claims, 5 Drawing Sheets

(51) Int. Cl.
*B29K 705/12* (2006.01)
*B29L 31/38* (2006.01)

PREPARATION METHOD OF A PASSIVE HORN

CROSS REFERENCE TO RELATED APPLICATIONS

This application claims priority of Application No. CN 201810426800.8 filed in China on May 7, 2018 under 35 U.S.C. § 119, the entire contents of all of which are hereby incorporated by reference.

TECHNICAL FIELD

The present invention relates to a horn, in particular, to a passive horn integrally formed by using liquid silicone rubber and a preparation method thereof.

BACKGROUND

At present, the traditional preparation process of passive horns used in the industry is that the hard rubber shell, the folding ring, the iron piece and the like of the sound are separately processed, and then subjected to surface treatment, glue coating, lamination, compaction and the like.

This multi-step processing method has low production efficiency and low yield of finished products. The folding ring is thermoformed using a thermosetting rubber material, and the scrap cannot be reused, resulting in waste. The volatiles in the surface treatment and adhesive-coating process are prone to environmental pollution, and manual bonding often causes the boundary lines to be uneven and affect the appearance of the product.

SUMMARY

In order to solve the above problems existing in the prior art, the present invention provides a passive horn integrally formed by using liquid silicone rubber and a preparation method thereof, wherein the sealing ring, the folding ring and the vibrating membrane are injection-molded into an integral structure by using an integral injection-molding process, wherein the injection-molding process is easy to implement and the package is stable, having the advantages of simple structure, good sealing effect, firm structure, perfect appearance, no combined line, and full automatic production, thereby replacing the traditional production mode and high production efficiency.

To achieve the above object, the present invention provides the following technical solution.

A passive horn integrally formed by using liquid silicone rubber, includes a first outer casing, a second outer casing, an inner casing and an iron piece; the first outer casing includes a sealing ring, a folding ring and a vibrating membrane, and the sealing ring, the folding ring and the vibrating membrane are integrally injection molded into the first outer casing; a groove is disposed in the second outer casing, and the first outer casing is disposed in the groove; the back surface of the vibrating membrane is provided with a casing groove, and the casing groove is sequentially embedded with the inner casing and the iron piece.

Further, the cross section of the inner casing is a T-shaped structure, and the cross section of the iron piece is an inverted T-shaped structure, the T-shaped structure cooperating with the inverted T-shaped structure.

Further, the iron piece is provided with two positioning holes.

Further, the positioning hole is shaped as a strip hole or a round hole.

The present invention further provides a preparation method of the above passive horn integrally. The method includes positioning an iron piece in a mold by means of a positioning hole; injecting a plastic raw material or liquid silicone rubber raw material into the mold while injection-molding a first outer casing, a second outer casing and an inner casing wrappings an iron piece to form an integral structure, wherein the first outer casing is formed by integrally injection-molding with a sealing ring, a folding ring and a vibrating membrane; and after completing the injection-molding, performing heating and vulcanization and then removing the mold.

Further, the molten plastic raw material or liquid silicone rubber raw material may also be injected into the mold in the form of encapsulation, the second outer casing is injection-molded first and the inner casing is wrapped with the iron piece, and then the first outer casing is injection-molded, so as to form an integral structure, wherein the first outer casing is formed by integrally injection-molding with the sealing ring, the folding ring and the vibrating membrane.

Further the material of the first outer casing is a liquid silicone rubber.

Further, the materials of the second outer casing and the inner casing are all PC materials.

Further, during the removing, the temperature of the injection molding is about 20 degrees Celsius, and the pressure of the injection molding is less than 20 MPa.

Based on the above technical solutions, the technical effects obtained by the present invention are:

(1) In the preparation method of above passive horn integrally formed by using liquid silicone rubber provided by the present invention, there is no waste of the hard rubber outer casing and the material of the folding ring during the injection molding, which saves the cost and improves the utilization rate of the material without causing environmental pollution. At the same time, since the sealing ring, the folding ring and the vibrating membrane are injection-molded into an integral structure by using an integral injection-molding process, the injection-molding process is easy to implement and the package is stable, so that the structure is simple, the sealing effect is good, the structure is firm, the appearance is perfect, and there is no bonding line.

(2) In the passive horn integrally formed by using liquid silicone rubber provided by the present invention, under the condition of integral injection-molding, the product quality is guaranteed, the assembly time and labor cost are saved, and the production efficiency is improved.

Figure 1:
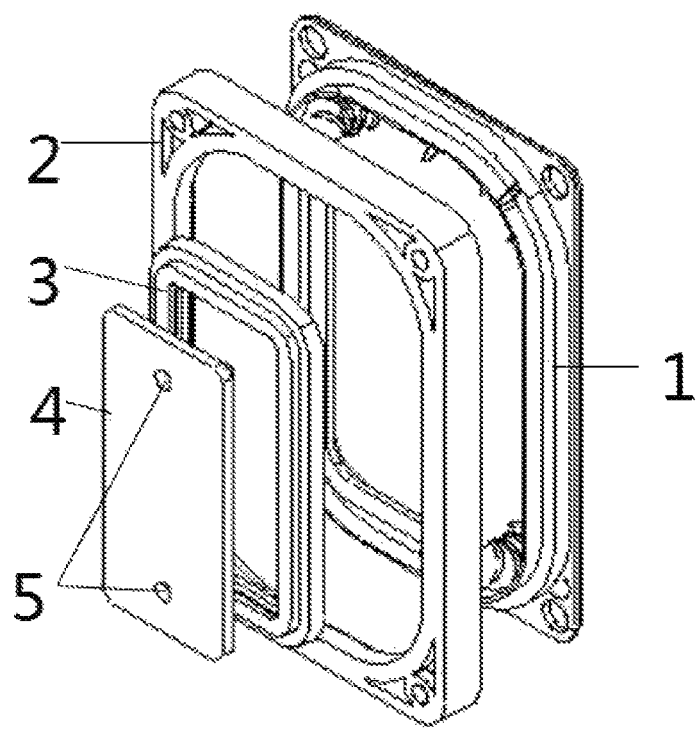
FIG. 1 is an exploded view of the passive horn integrally formed by using liquid silicone rubber according to the present invention.
Figure 2:
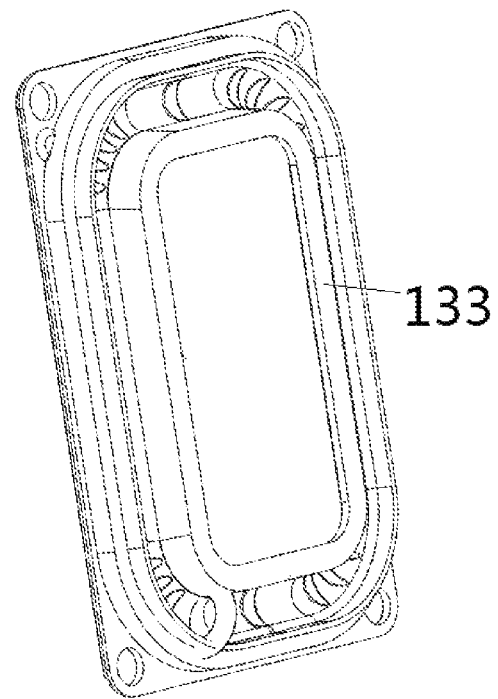
FIG. 2 is a perspective view of the first outer casing according to the present invention.
Figure 3:
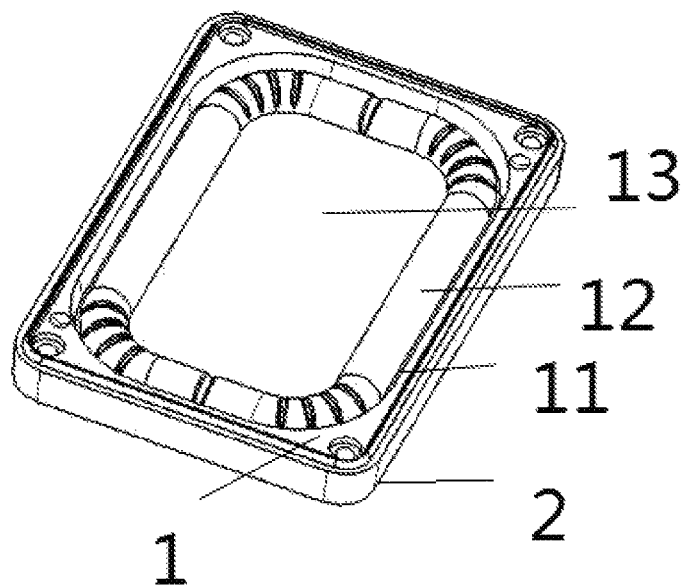
FIG. 3 is an overall view of the passive horn integrally formed by using liquid silicone rubber according to the present invention.
Figure 4:
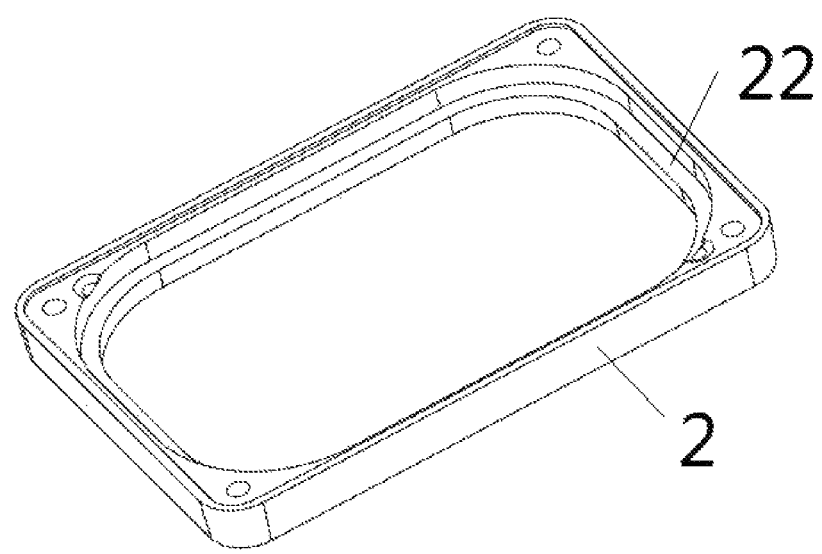
FIG. 4 is a perspective view of the second outer casing according to the present invention.
Figure 5:
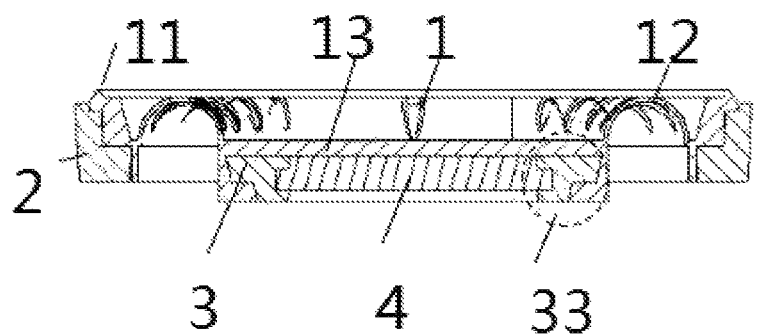
FIG. 5 is a cross-sectional view of the passive horn integrally formed by using liquid silicone rubber according to the present invention.

Among those, the reference numerals are as follows:
1 first outer casing
2 second outer casing
3 inner casing
4 iron piece
5 positioning hole
11 sealing ring
12 folding ring
13 vibrating membrane
133 casing groove
22 groove
33 T-shaped structure

DETAILED DESCRIPTION

The present invention will be described more fully hereinafter with reference to the accompanying drawings and specific embodiments. Preferred embodiments of the present invention are given in the drawings. However, the present invention may be embodied in many different forms and is not limited to the embodiments described herein. Rather, these embodiments are provided so that the disclosure will be more fully understood.

It should be noted that when an element is referred to as being "fixed" to another element, it can be directly on the other element or a centered element can be present. When an element is considered to be "connected" to another element, it can be directly connected to a centered element can be present simultaneously.

For ease of reading, the terms "upper", "lower", "left", and "right" are used in the drawings to indicate the relative position of the reference between the elements, and not to limit the present application.

All technical and scientific terms used herein have the same meaning as commonly understood by one of ordinary skill in the art to which this invention belongs, unless otherwise defined. The term used in the description of the present invention is for the purpose of describing specific embodiments and is not intended to limit the present invention.

Embodiment 1

As shown in FIGS. 1 to 5, a passive horn integrally formed by using liquid silicone rubber comprises a first outer casing 1, a second outer casing 2, an inner casing 3 and an iron piece 4; the first outer casing 1 includes a sealing ring 11, a folding ring 12 and a vibrating membrane 13, and the sealing ring 11, the folding ring 12 and the vibrating membrane 13 are integrally injection molded into the first outer casing 1; a groove 22 is disposed in the second outer casing 2, and the first outer casing 1 is disposed in the groove 22; the back surface of the vibrating membrane 13 is provided with a casing groove 133, and the casing groove 133 is sequentially embedded with the inner casing 3 and the iron piece 4.

The cross section of the inner casing 3 is a T-shaped structure 33, and the cross section of the iron piece 4 is an inverted T-shaped structure, the T-shaped structure cooperating with the inverted T-shaped structure, so that the tightness of the inner casing 3 and the iron piece 4 may be enhanced, and the connection between the two may be ensured to be firm and stable.

The iron piece 4 is provided with two positioning holes 5, and the positioning hole 5 is shaped as a strip hole or a round hole.

In the present embodiment, the sealing ring, the folding ring and the vibrating membrane are injection-molded into an integral structure by using an integral injection-molding process, wherein the injection-molding process is easy to implement and the package is stable, so that the structure is simple, the sealing effect is good, the structure is firm, the appearance is perfect, and there is no bonding line.

And, under the condition of integral injection-molding, the product quality is guaranteed, the assembly time and labor cost are saved, and the production efficiency is improved.

Embodiment 2

Figure 6:
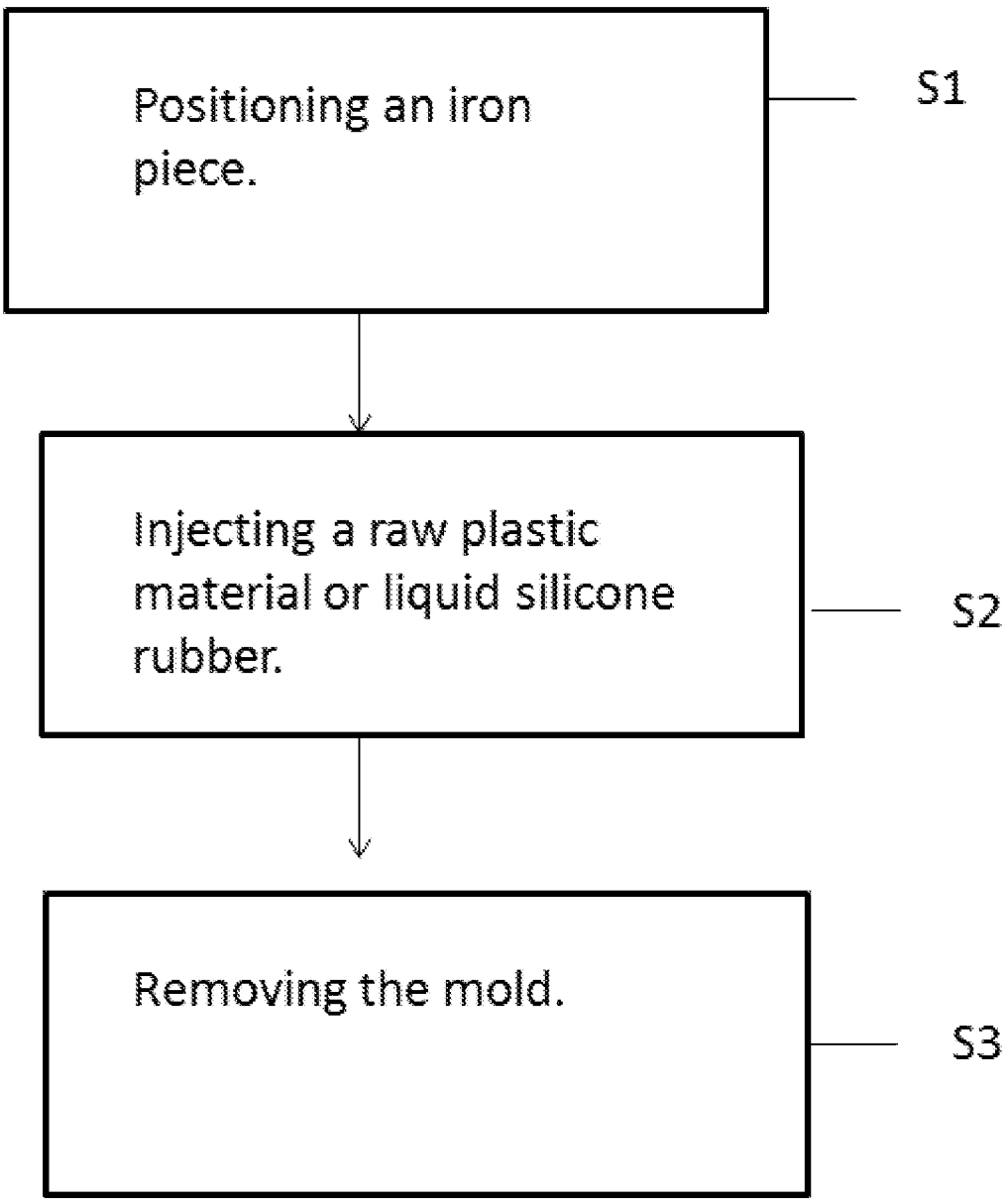
FIG. 6 illustrates a preparation method of the above passive horn integrally according to an exemplary embodiment of the invention.

A preparation method, as illustrated in FIG. 6, of above passive horn integrally formed by using liquid silicone rubber, includes:

S1, positioning an iron piece in a mold by means of a positioning hole;

S2, injecting a plastic raw material or liquid silicone rubber raw material into the mold while injection-molding a first outer casing, a second outer casing and an inner casing wrapping an iron piece to form an integral structure, wherein the first outer casing is formed by integrally injection-molding with a sealing ring, a folding ring and a vibrating membrane;

S3, after completing the injection-molding, performing heating and vulcanization and then removing the mold.

In the present embodiment, the material of the first outer casing is a liquid silicone rubber belonging to thermosetting rubber, which has the characteristics of good weather resistance, wear resistance, good elasticity and compression deformation resistance of the thermoset rubber, and the good fluidity of the liquid material, may be vulcanized by heating, and may be injection molded; the materials of the second outer casing and the inner casing are PC material, which ensures the high strength of the passive horn produced, wherein both liquid silicone rubber and PC have good adhesion and may be formed by injection molding.

In the present embodiment, in step S3, the temperature of the injection molding is about 20 degrees Celsius, and the pressure of the injection molding is less than 20 MPa. The heating vulcanization method may be vulcanized by heating with an electric heating rod or oil temperature.

In the present embodiment, a two-color liquid silicone rubber injection-molding machine is used to simultaneously injection-mold the first outer casing, the second outer casing and the inner casing wrapping the iron piece through two sets of two-color injection-molding molds, that is, forming with one-time injection-molding to realize product production.

In the present embodiment, two-color liquid silicone rubber injection-molding machine is adopted, through two materials (liquid silicone rubber and PC) injection-molding mold, using two materials (liquid silicone rubber and PC) injection molding equipment combined with robot automated production, so as to improve production efficiency, improve the pass rate of finished products, and reduce product costs.

In the present embodiment, there is no waste of the hard rubber outer casing and the material of the folding ring during the injection molding, which saves the cost and improves the utilization rate of the material without causing environmental pollution. At the same time, since the sealing ring, the folding ring and the vibrating membrane are injection-molded into an integral structure by using an integral injection-molding process, the injection-molding process is easy to implement and the package is stable, so that the structure is simple, the sealing effect is good, the structure is firm, the appearance is perfect, and there is no bonding line.

Embodiment 3

Figure 7:
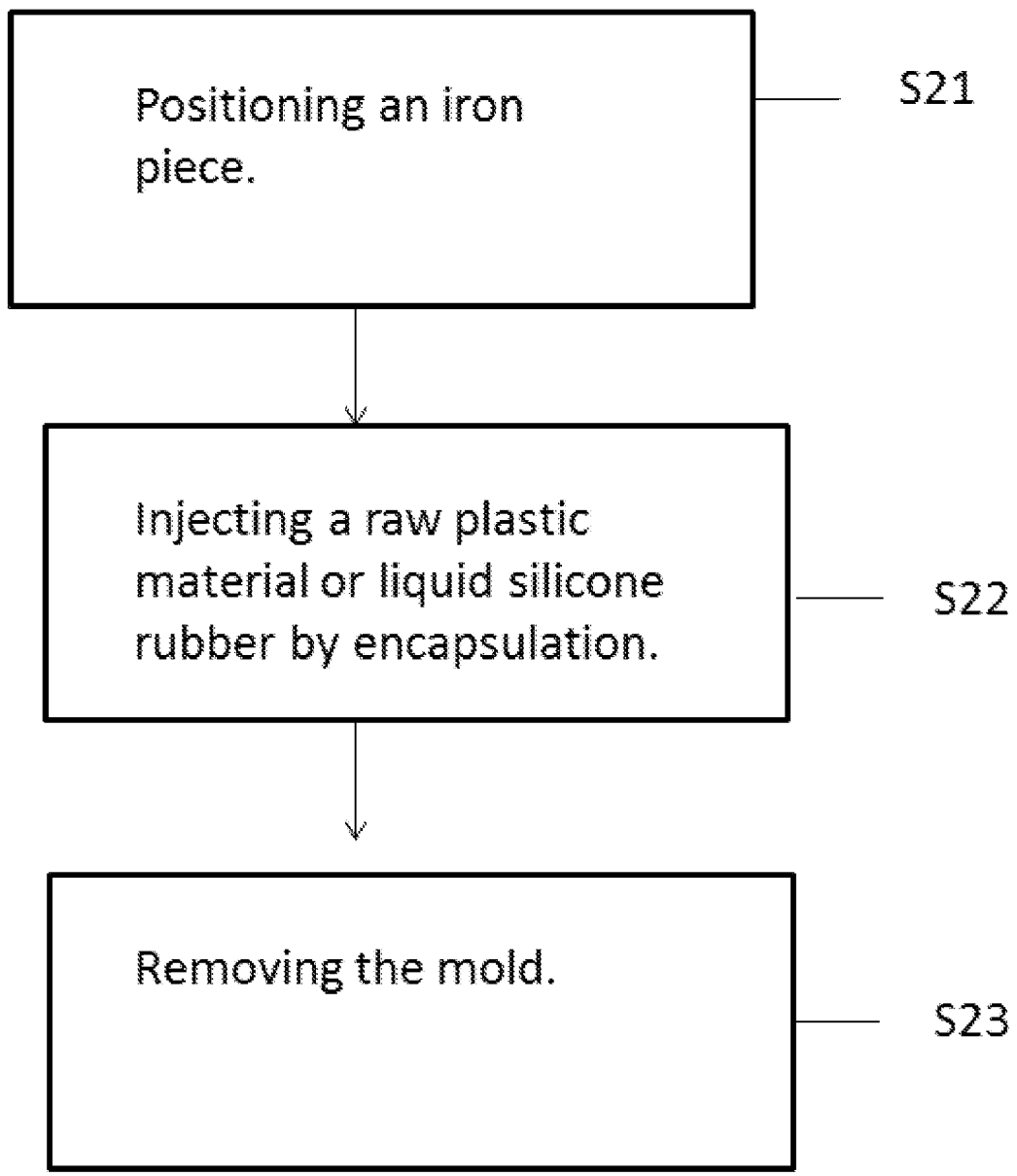
FIG. 7 illustrates a preparation method of the above passive horn integrally according to another exemplary embodiment of the invention.

A preparation method, as illustrated in FIG. 7, of above passive horn integrally formed by using liquid silicone rubber, includes:

S21, positioning an iron piece in a mold by means of a positioning hole;

S22, the molten plastic raw material or liquid silicone rubber raw material is used for overmolding, the second outer casing and inner casing are injection-molded first, wherein the iron piece is wrapped within the inner casing, and then the first outer casing is injection-molded, to form an integral structure, wherein the first outer casing is formed by integrally injection-molding with the sealing ring, the folding ring and the vibrating membrane.

S23, after completing the injection-molding, performing heating and vulcanization and then removing the mold.

In the present embodiment, the material of the first outer casing is a liquid silicone rubber belonging to thermosetting rubber, which has the characteristics of good weather resistance, wear resistance, good elasticity and compression deformation resistance of the thermoset rubber, and the good fluidity of the liquid material, may be vulcanized by heating, and may be injection molded; the materials of the second outer casing and the inner casing are PC material, which ensures the high strength of the passive horn produced, wherein both liquid silicone rubber and PC have good adhesion and may be formed by injection molding.

In the present embodiment, in step S3, the temperature of the injection molding is about 20 degrees Celsius, and the pressure of the injection molding is less than 20 MPa.

In the present embodiment, using a conventional injection-molding machine, i.e. a vertical injection-molding machine or horizontal injection-molding machine, plus a conventional liquid silicone rubber injection-molding machine, the second outer casing and the inner casing iron piece are injection-molded first in the first set of molds through the conventional injection-molding machine workbench, then the second outer casing and the inner casing iron piece are placed into the second set of molds to injection-mold the first outer casing to form an integral structure by using the conventional liquid silicone rubber injection-molding machine, so that after two sets of molds are placed on two different conventional injection-molding machines, the product is produced by two injection-moldings, and then with combination of robotic automated production, the production efficiency is improved, the yield of finished products is improved, and the product cost is reduced.

In the present embodiment, there is no waste of the hard rubber outer casing and the material of the folding ring during the injection molding, which saves the cost and improves the utilization rate of the material without causing environmental pollution. At the same time, since the sealing ring, the folding ring and the vibrating membrane are injection-molded into an integral structure by using an integral injection-molding process, the injection-molding process is easy to implement and the package is stable, so that the structure is simple, the sealing effect is good, the structure is firm, the appearance is perfect, and there is no bonding line.

The above description is only examples and illustrative of the structure of the present invention, and the description thereof is more specific and detailed, but is not to be construed as limiting the scope of the present invention. It should be noted that it will be apparent to those skilled in the art that various modifications and improvements can be made without departing from the spirit and scope of the present invention. These obvious alternatives are all within the scope of the present invention.

The invention claimed is:

1. A preparation method of a passive horn including a first outer casing, a second outer casing, an inner casing and an iron piece, the first outer casing comprising a sealing ring, a folding ring and a vibrating membrane, the method comprising:
    positioning the iron piece in a mold by means of a positioning hole formed on the iron piece;
    injection-molding the first outer casing, the second outer casing and the inner casing by injecting a plastic raw material or liquid silicone rubber raw material into the mold, wherein the sealing ring, the folding ring and the vibrating membrane are integrally injection molded to form an integral structure, the iron piece is wrapped by the inner casing and the second outer casing is disposed around the inner casing; and
    after completing the injection-molding, removing the mold by heating and vulcanization to form the passive horn.

2. The preparation method according to claim 1, wherein the injection-molding comprises a process of forming the second outer casing and the inner casing first, and then forming the first outer casing.

3. The preparation method according to claim 1, wherein the material of the first outer casing is a liquid silicone rubber.

4. The preparation method according to claim 1, wherein the materials of the second outer casing and the inner casing are PC materials.

5. The preparation method according to claim 1, wherein the injection-molding temperature is about 20 degrees Celsius, and the injection-molding pressure is less than 20 MPa.

6. The preparation method according to claim 1, wherein the inner casing has a cross section being T-shaped structure, the iron piece has a cross section being an inverted T-shaped structure, and the T-shaped structure and the inverted T-shaped structure complement each other.

7. The preparation method according to claim 2, further comprising using a double color injection molding machine to perform the step of injection-molding the first outer casing, the second outer casing and the inner casing.

* * * * *